US012597530B2

(12) United States Patent
Harkness

(10) Patent No.: US 12,597,530 B2
(45) Date of Patent: Apr. 7, 2026

(54) DEVICES, SYSTEMS, AND METHODS FOR COOLING A NUCLEAR REACTOR WITH HYDRIDE MODERATORS

(71) Applicant: Westinghouse Electric Company LLC, Cranberry Township, PA (US)

(72) Inventor: Alexander Whitecross Harkness, Allison Park, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 472 days.

(21) Appl. No.: 18/153,247

(22) Filed: Jan. 11, 2023

(65) Prior Publication Data

US 2024/0233966 A1 Jul. 11, 2024

(51) Int. Cl.
*G21C 15/08* (2006.01)
*G21C 15/257* (2006.01)
*G21C 5/02* (2006.01)

(52) U.S. Cl.
CPC ........... *G21C 15/08* (2013.01); *G21C 15/257* (2013.01); *G21C 5/02* (2013.01)

(58) Field of Classification Search
CPC ......... G21C 5/02; G21C 15/08; G21C 15/257
See application file for complete search history.

(56) References Cited

U.S. PATENT DOCUMENTS

| | | | | |
|---|---|---|---|---|
| 12,176,113 | B1 * | 12/2024 | Reid | G21C 15/08 |
| 2016/0027536 | A1 * | 1/2016 | Mcclure | G21F 5/14 376/277 |
| 2018/0268950 | A1 * | 9/2018 | Mckellar | G21D 1/006 |
| 2021/0199383 | A1 * | 7/2021 | Armstrong | F28D 7/1669 |

FOREIGN PATENT DOCUMENTS

| | | | | |
|---|---|---|---|---|
| CN | 111883266 | A | 3/2020 | |
| GB | 2024401 | A * | 1/1980 | F28D 15/0275 |
| GB | 2630552 | A * | 11/2024 | G21C 15/02 |

OTHER PUBLICATIONS

International Search Report and Written Opinion for corresponding International Application No. PCT/US2024/011177 mailed Jul. 4, 2024.

* cited by examiner

*Primary Examiner* — Sharon M Davis
(74) *Attorney, Agent, or Firm* — K&L Gates LLP

(57) ABSTRACT

A heat exchanger for cooling a nuclear reactor core is disclosed herein. The heat exchanger can include a first stage including an input configured to receive a working fluid from an external source into the heat exchanger, and a first plenum configured to envelope a moderator heat pipe extending from the nuclear reactor core. The heat exchanger can further include a second stage including an output configured to remove a working fluid from the heat exchanger to the external source, and a second plenum configured to envelope a power heat pipe extending from the nuclear reactor core, wherein the first plenum and the second plenum are in fluid communication and configured such that the external fluid must traverse the first plenum and over the moderator heat pipe before entering the second plenum and traversing over the power heat pipe.

20 Claims, 6 Drawing Sheets

DEVICES, SYSTEMS, AND METHODS FOR COOLING A NUCLEAR REACTOR WITH HYDRIDE MODERATORS

FIELD

The present disclosure is generally related to nuclear power generation and, more particularly, is directed to neutron moderation provided by hydride moderators in a thermal or epi-thermal spectrum heat pipe reactor at elevated temperatures.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a heat exchanger for cooling a nuclear reactor core is disclosed. The heat exchanger can include a first stage including an input configured to receive a working fluid from an external source into the heat exchanger, and a first plenum configured to envelope a moderator heat pipe extending from the nuclear reactor core. The heat exchanger can further include a second stage including an output configured to remove a working fluid from the heat exchanger to the external source, and a second plenum configured to envelope a power heat pipe extending from the nuclear reactor core, wherein the first plenum and the second plenum are in fluid communication and configured such that the external fluid must traverse the first plenum and over the moderator heat pipe before entering the second plenum and traversing over the power heat pipe.

In various aspects, a system is disclosed. The system can include a nuclear reactor core, including a moderator heat pipe coupled to a moderator cell positioned within the nuclear reactor core; and a power heat pipe coupled to a fuel cell positioned within the nuclear reactor core. The system can further include a heat exchanger including a first plenum configured to envelope the moderator heat pipe, and a second plenum configured to envelope the power heat pipe. The first plenum and the second plenum are in fluid communication and configured such that an external fluid must traverse the first plenum and about the moderator heat pipe before entering the second plenum and traversing about the power heat pipe.

In various aspects, a method of cooling a nuclear reactor core is disclosed. The method can include introducing, via an input of a first plenum, an external working fluid into a first stage of a two-stage heat exchanger, transferring, via the working fluid, thermal energy away from a moderator heat pipe extending from the nuclear reactor core, introducing, via a fluid path, the working fluid into a second stage of the two-stage heat exchanger, transferring, via the working fluid, thermal energy away from a power heat pipe extending from the core of the nuclear reactor, and converting, via a power conversion sub-system, the thermal energy transferred away from the moderator heat pipe and the thermal energy transferred away from the power heat pipe into usable energy.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
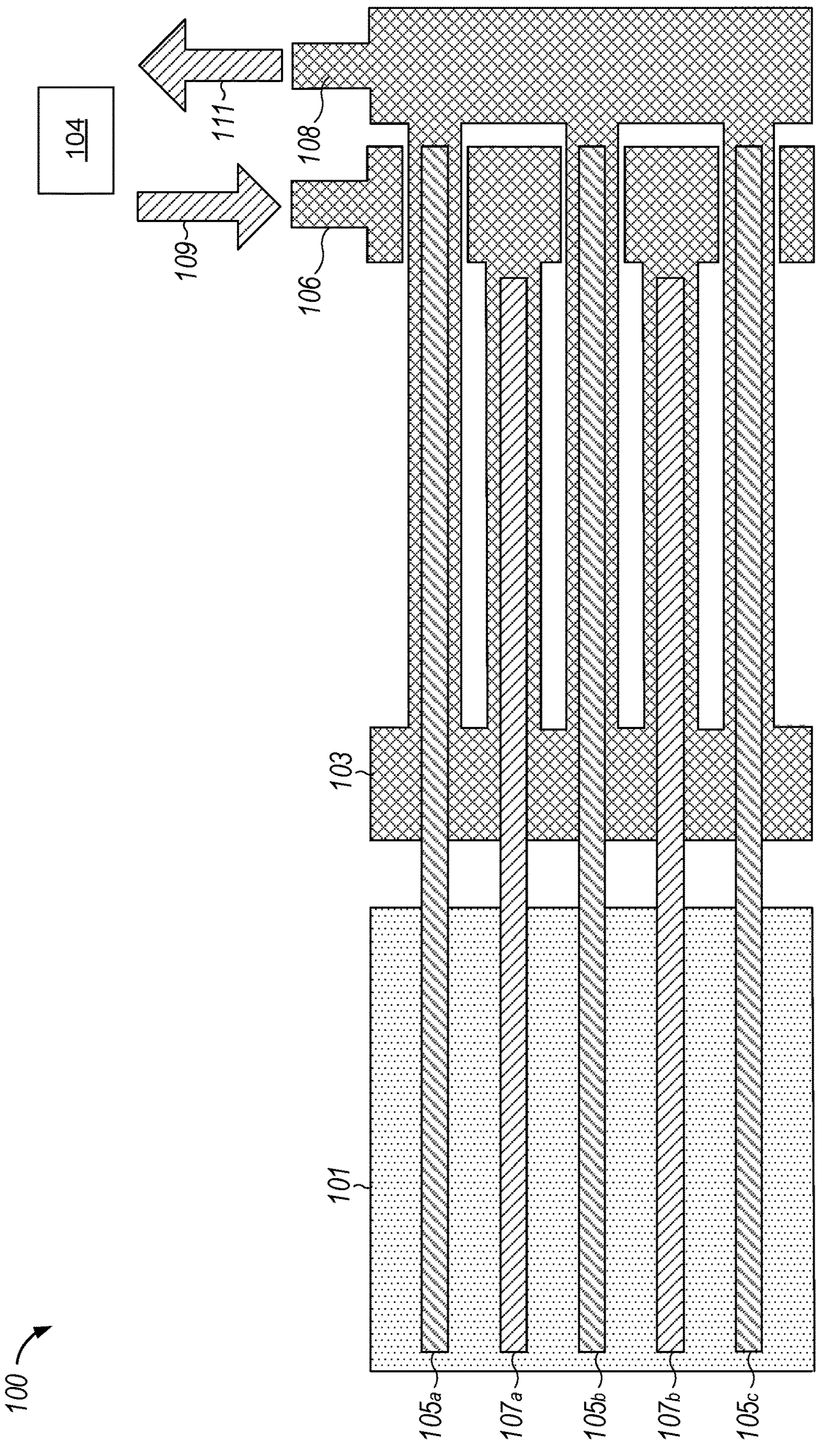
FIG. 1 illustrates a cross-sectioned view of an improved system for cooling a nuclear reactor with hydride moderators, in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as “forward”, “rearward”, “left”, “right”, “upwardly”, “downwardly”, and the like are words of convenience and are not to be construed as limiting terms.

Before explaining various aspects of the various heat exchangers disclosed herein in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

As nuclear reactors continue to decrease in size, heat pipe-based cooling systems are emerging as a means of facilitating a more simplistic reactor design. For example, heat pipes utilize a closed system featuring a small amount of condensable gas (e.g., a working fluid) to achieve relatively high rates of heat transfer in a relatively small cross-sectional area. Such a simplistic and compact design lends itself for implementation in a microreactor. Additionally, heat pipe-bases systems require no active, moving parts, as heat produced by the reactor can be removed using an array of heat pipes with a working fluid (e.g., sodium, potassium, etc.) that is transported through three regions (e.g., an evaporator region, a condenser region, and an adiabatic region) via a capillary or wicking action. The working fluid removes thermal energy from the heat-producing core of the reactor via the evaporator region of the heat pipe, and transports the thermal energy to the condenser region of the heat pipe, which is connected to a power conversion system configured to turn the heat into usable energy (e.g., electricity, etc.).

However, hydride moderators have also emerged as viable means for improving core neutronics and thus, enhancing the overall performance and efficiency of the nuclear reactor. For example, the efficiency of a nuclear reactor is a function of the temperature of the heat produced by the core and the environment within which that heat is ejected. As that temperature differential increases, so does the theoretical maximum efficiency of the overall system. Therefore, it is desirable to operate nuclear reactors at higher temperatures. Although hydride moderators can improve neutron economy, some hydride materials-such as yttrium hydride and zirconium hydride—generally undergo hydrogen dissociation at elevated temperatures, which can deteriorate the moderation capabilities of the hydride. However, given the simplistic design of a heat pipe-based cooling system for a nuclear reactor, it would be counterintuitive to introduce a separate, active system to maintain lower temperatures in the hydride moderators, themselves. Therefore, there is a need for improved devices, systems, and methods for cooling a nuclear reactor with hydride moderators. Such devices, systems, and methods might alter the arrangement of heat pipes, moderators, and other nuclear materials to achieved higher temperature differentials throughout the nuclear reactor to maintain the stability of the hydride moderator material, without increasing the complexity of the design or otherwise compromising the aforementioned benefits of a heat pipe-based cooling system.

Referring now to FIG. 1, an improved system 100 for cooling a nuclear reactor with hydride moderators is depicted in accordance with at least one non-limiting aspect of the present disclosure. According to the non-limiting aspect of FIG. 1, the system 100 can include a nuclear reactor core 101 portion, a heat exchanger 103 portion, and a power conversion sub-system 104 portion. The system 100 can further include a plurality of heat pipes 105$_{a-c}$, 107$_a$, 107$_b$, including one or more power heat pipes 105$_{a-c}$ (collectively, "105") and one or more moderator heat pipes 107$_a$, 107$_b$ (collectively, "107"). As previously discussed, an evaporator region of each heat pipe 105, 107 of the plurality can be positioned within the nuclear reactor core 101 portion and a condenser portion of each heat pipe 105, 107 of the plurality can be positioned within the power conversion sub-system 104. An adiabatic region—or a region where heat neither enters nor leaves the closed system—of each heat pipe 105, 107 of the plurality can be disposed between the condenser and evaporator portions. According to the non-limiting aspect of FIG. 1, a seal can connect the heat exchanger portion 103 to the power heat pipes 105 and the moderator heat pipes 107 of the nuclear reactor core 101 portion.

In further reference to FIG. 1, the one or more moderator heat pipes 107 are configured to transfer thermal energy away from moderator cells of the reactor core 101 portion, which can contain hydride materials-such as yttrium hydride and zirconium hydride. As previously discussed, transference of thermal energy away from the moderator cells can ensure that hydrogen is not dissociated from the hydride, which can occur at elevated temperatures-including those that are standard during nuclear core operation. As depicted in FIG. 1, a second, separate set of heat pipes 105 can be configured to transfer thermal energy away from fuel cells of the reactor core 101 portion, which can contain a fissile material, or any material that can undergo the fission reaction. Specifically, the power heat pipes 105 can be arranged within the nuclear reactor core 101 portion such that they penetrate, or are otherwise engaged with, fuel cells of the nuclear reactor core 101 portion. The moderator cells and fuel cells of the reactor core 101 portion of the system 100 can be thermally insulated from one another, which allows the fuel cells to operate at high temperatures while maintaining lower moderator cell temperatures to prevent hydrogen dissociation.

According to the non-limiting aspect of FIG. 1, each heat pipe 105, 107 of the plurality can have a working fluid (e.g., sodium, potassium, etc.) configured to traverse a length of the pipe 105, 107 and evaporate and/or condense as it encounters different thermal environments of the system 100. An external working fluid (e.g., air, helium, etc.) can be introduced into the system 100 via an input 109 of a first plenum 106 and removed from the system 100 via an output 111 of a second plenum 108 as a means of cooling each heat pipe 105, 107 of the plurality to ensure that neither the moderator cells nor the fuel cells achieve a critical temperature at which heat is no longer optimally removed from the system 100.

However, according to the non-limiting aspect of FIG. 1, in order to prevent hydrogen dissociation, it would be preferable if the system 100 were configured such that the one or more moderator heat pipes 107 were cooled by the external working fluid prior to exposure to the power heat pipes 105. Although the first plenum 106 is in fluid communication with the second plenum 108, the first plenum 106 is configured such that the external working fluid first traverses over the moderator heat pipes 107 upon entering via the inlet 109. The external working fluid first encounters the one or more power heat pipes 105 upon arriving at the end of the heat exchanger 103 portion of the system 100, after which the working fluid loops back on its way to the second plenum 108 and out of the system 100 towards the power conversion sub-system 104. Additionally, the parallel nature of the conduits the place the first plenum 106 and second plenum 108 in fluid communication mirrors the heat pipe 105, 107 arrangement of the system 100 and promotes heat transfer from the heat pipes to the external working fluid.

In other words, the system 100 of FIG. 1 is configured to function as a two-stage power conversion heat exchanger. The first plenum 106 and second plenum 108 are only in fluid communication with one another via conduits that force the external working fluid to traverse the moderator heat pipes 107 before the external working fluid traverses the power heat pipes 105. As such, during a first stage of the two-stage system 100, the external working fluid transfers thermal energy away from the moderator heat pipes 107 and, during the second stage of the two-stage system 100, the external working fluid transfers thermal energy away from the power heat pipes 105. During the second stage, the power heat pipes 105 are arranged in a second set of parallel channels configured to promote the transfer of thermal energy from the power heat pipes 105 to the external working fluid to remove heat from the nuclear reactor core 101 portion for conversion into usable energy (e.g., electricity, etc.). This can be accomplished by the power conversion sub-system 104, which can be configured as a Brayton system. The power conversion sub-system 104 can be either an open or a closed system according to user preference and/or intended application.

The two-stage configuration of the system 100 of FIG. 1 ensures that the external working fluid is at its coolest temperature prior to traversing the one or more moderator heat pipes 107, which results in an optimal amount of thermal energy being transferred away from moderator cells and mitigates the risk of hydrogen dissociation in the moderator cells. If the configuration were reversed, the external working fluid would contain thermal energy transferred away from the power heat pipes 105 prior to encountering the moderator heat pipes 107, thereby reducing the amount of thermal energy transferred away from the moderator heat pipes 107 and increasing the risk of hydrogen dissociation.

Accordingly, it shall be appreciated that the system 100 of FIG. 1 provides: (1) a temperature differential between the first stage and the second stage; (2) insulation between the fissile material and the moderator; and (3) substantial heat generation in the core confined to the fissile material. These features enable to system 100 of FIG. 1 to operate moderator cells within the nuclear reactor core 101 portion at substantially lower temperatures and fuel cells within the nuclear reactor core 101 portion at substantially higher temperatures, relative to conventional systems. Thus, the system 100 generates more optimal levels of energy while preventing hydrogen dissociation within the moderator cells. Although the non-limiting aspect of FIG. 1 depicts a particular system 100 configuration that provides the aforementioned features and benefits, it shall be appreciated that, according to other non-limiting aspects, the present disclosure contemplates systems of varying configurations designed to implement similar features to achieve similar benefits to those of the particular system 100 of FIG. 1.

Figure 2:
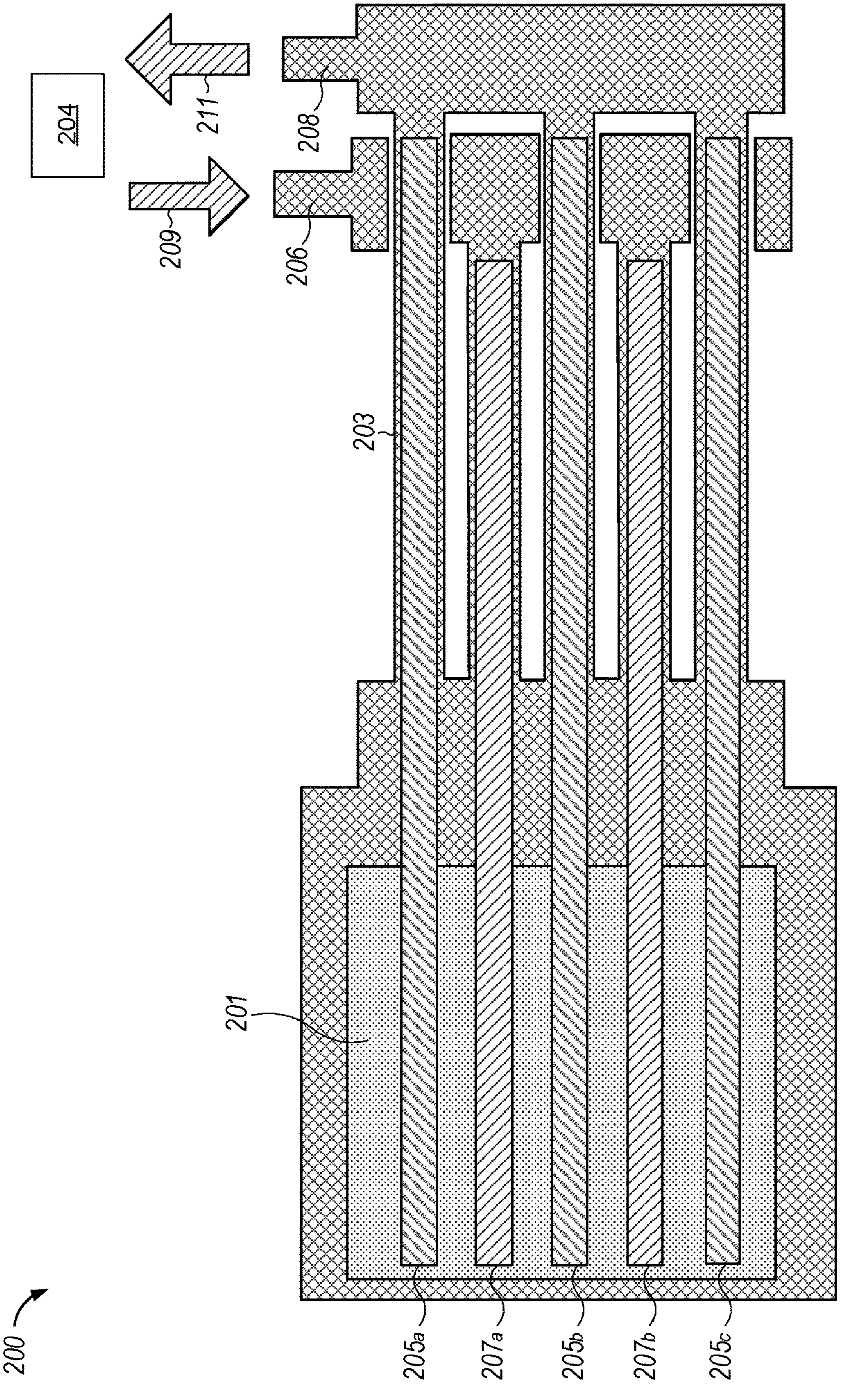
FIG. 2 illustrates another cross-sectioned view of an improved system for cooling a nuclear reactor with hydride moderators, in accordance with at least one other non-limiting aspect of the present disclosure.

For example, referring now to FIG. 2, another improved system 200 for cooling a nuclear reactor with hydride moderators is depicted in accordance with at least one other non-limiting aspect of the present disclosure. According to the non-limiting aspect of FIG. 2, a nuclear reactor core 201 portion of the system 200 is integral to and/or positioned within an enclosure of a heat exchanger 203 portion of the system 200. However, similar to the system 100 of the non-limiting aspect of FIG. 1, the system 200 of FIG. 2 once again includes a plurality of heat pipes $\mathbf{205}_{a-c}$, $\mathbf{207}_a$, $\mathbf{207}_b$, including one or more power heat pipes $\mathbf{205}_{a-c}$ (collectively, "205") and one or more moderator heat pipes $\mathbf{207}_a$, $\mathbf{207}_b$ (collectively, "207").

Still referring to FIG. 2, similar to the heat pipes 105, 107 of the system 100 of FIG. 1, the one or more moderator heat pipes 207 can be configured to transfer thermal energy away from moderator cells of the reactor core 201 portion and the one or more power heat pipes 205 can be configured to transfer thermal energy away from fuel cells of the reactor core 201 portion. Each heat pipe 205, 207 of the plurality can include a working fluid (e.g., sodium, potassium, etc.) configured to traverse a length of the pipe 205, 207 and evaporate and/or condense as it encounters different thermal environments of the system 200. An external working fluid (e.g., air, helium, etc.) can once again be introduced into the system 200 via an input 209 of a first plenum 206 and removed from the system 200 via an output 211 of a second plenum 208.

The first plenum 206 and second plenum 208 of the system 200 of FIG. 2 are only in fluid communication with one another via conduits that force the external working fluid to traverse the moderator heat pipes 207 before the external working fluid traverses the power heat pipes 205. During a first stage of the two-stage system 200, the external working fluid transfers thermal energy away from the moderator heat pipes 207 and, during the second stage of the two-stage system 200, the external working fluid transfers thermal energy away from the power heat pipes 205. During the second stage, the power heat pipes 205 are arranged in a second set of parallel channels configured to promote the transfer of thermal energy from the power heat pipes 205 to the external working fluid to remove heat from the nuclear reactor core 201 portion for conversion into usable energy (e.g., electricity, etc.) via a power conversion sub-system 204. The power conversion sub-system 204 can be configured similar to the power conversion sub-system 104 of the system 100 of FIG. 1. The two-stage configuration of the system 200 of FIG. 2 ensures that the external working fluid is at its coolest temperature prior to traversing the one or more moderator heat pipes 207, which results in an optimal amount of thermal energy being transferred away from moderator cells and mitigates the risk of hydrogen dissociation in the moderator cells.

However, according to the non-limiting aspect of FIG. 2, the nuclear reactor core 201 portion of the system 200 can be integral to and/or positioned within an enclosure of the heat exchanger 203 portion of the system 200. As such, the system 200 of FIG. 2 eliminates the need to seal the heat exchanger portion 203 to the one or more power heat pipes 205 and one or more moderator heat pipes 207 used by the nuclear reactor core 201 portion of the system 200, as the heat pipes 205, 207 are already positioned within the heat exchanger portion 203 and thus, in fluid communication with the first plenum 206 and second plenum 208. For example, the system 100 of FIG. 1 may require a seal to maintain the inventory of the power conversion system working fluid and/or prevent air (more specifically, oxygen) from entering the reactor core region where it could react with the materials of the reactor core causing damaging oxidation. However, sealing heat pipes can be challenging due to the anticipated thermal expansion. Additionally, according to non-limiting aspects wherein the systems 100, 200 use use a working fluid optimized for a closed system (e.g., helium), the size of the working fluid molecules may complicate the seal. Thus, similar to the system 100 of FIG.

1, the system 200 of FIG. 2 can also generate optimal levels of energy while preventing hydrogen dissociation within moderator cells, but no seal is required. This can reduce complexity of design, reduce anticipated maintenance costs and mitigate potential modes of failure.

Figure 3:
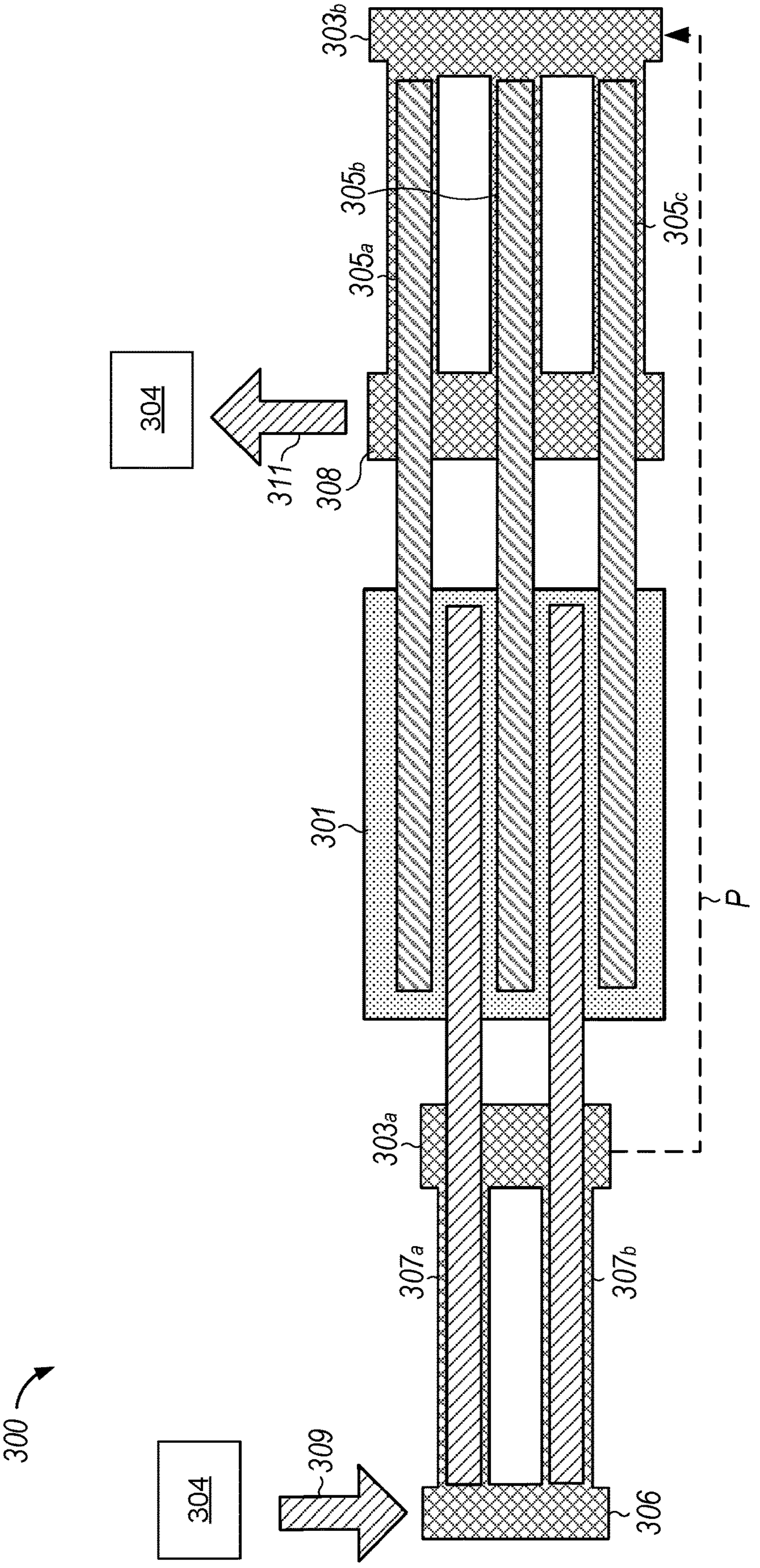
FIG. 3 illustrates another cross-sectioned view of an improved system for cooling a nuclear reactor with hydride moderators, in accordance with at least one other non-limiting aspect of the present disclosure.

Referring now to FIG. 3, another improved system 300 for cooling a nuclear reactor with hydride moderators is depicted in accordance with at least one other non-limiting aspect of the present disclosure. Similar to the systems 100, 200 of FIGS. 1 and 2, the system 300 of FIG. 3 is structured as a two-stage power conversion heat exchanger configured to transfer energy away from a plurality of heat pipes 305$_{a-c}$, 307$_{a}$, 307$_{b}$, including one or more power heat pipes 305$_{a-c}$ (collectively, "305") and one or more moderator heat pipes 307$_{a}$, 307$_{b}$ (collectively, "307"). Once again, the system 300 can include a nuclear reactor core 301 portion. However, according to the non-limiting aspect of FIG. 3, the system 300 can further include a first-stage first heat exchanger 303$_{a}$ portion that is disposed on an opposite side of the nuclear reactor core 301 portion relative to a second-stage heat exchanger 303; portion. This configuration may be suitable when the moderator heat pipes 307 and power heat pipes 305 enter the nuclear reactor core 301 portion from opposite sides. Nonetheless, the first-stage first heat exchanger 303$_{a}$ portion can be in fluid communication with the second-stage first heat exchanger 303$_{b}$ portion via a fluid path P, as depicted in FIG. 3. For example, the first-stage first heat exchanger 303$_{a}$ portion can be ducted together with connected piping, thereby forming the fluid path P, although other means of establishing fluid communication are contemplated by the present disclosure.

Accordingly, an external working fluid (e.g., air, helium, etc.) can be introduced into the system 300 of FIG. 3 via an input 309 of a first plenum 306 of the first-stage first heat exchanger 303$_{a}$ portion, where it transfers thermal energy away from the one or more moderator heat pipes 307 prior to traversing the fluid path P and entering the second-stage heat exchanger 303$_{b}$ portion. Upon entering the second-stage heat exchanger 303; portion, the external working fluid transfers thermal energy away from the one or more power heat pipes 307, after which it can exit the system 300 to a power conversion sub-system 304 the via an output 311 of a second plenum 308. The power conversion sub-system 304 can be configured similar to the power conversion sub-systems 104, 204 of FIGS. 1 and 2 and can turn thermal energy removed from the heat pipes 305, 307 into usable energy (e.g., electricity, etc.). As such, via the first-stage first heat exchanger 303$_{a}$ portion and the second-stage first heat exchanger 303; portion, the system 300 of FIG. 3 can also generate optimal levels of energy while preventing hydrogen dissociation within moderator cells.

Figure 4:
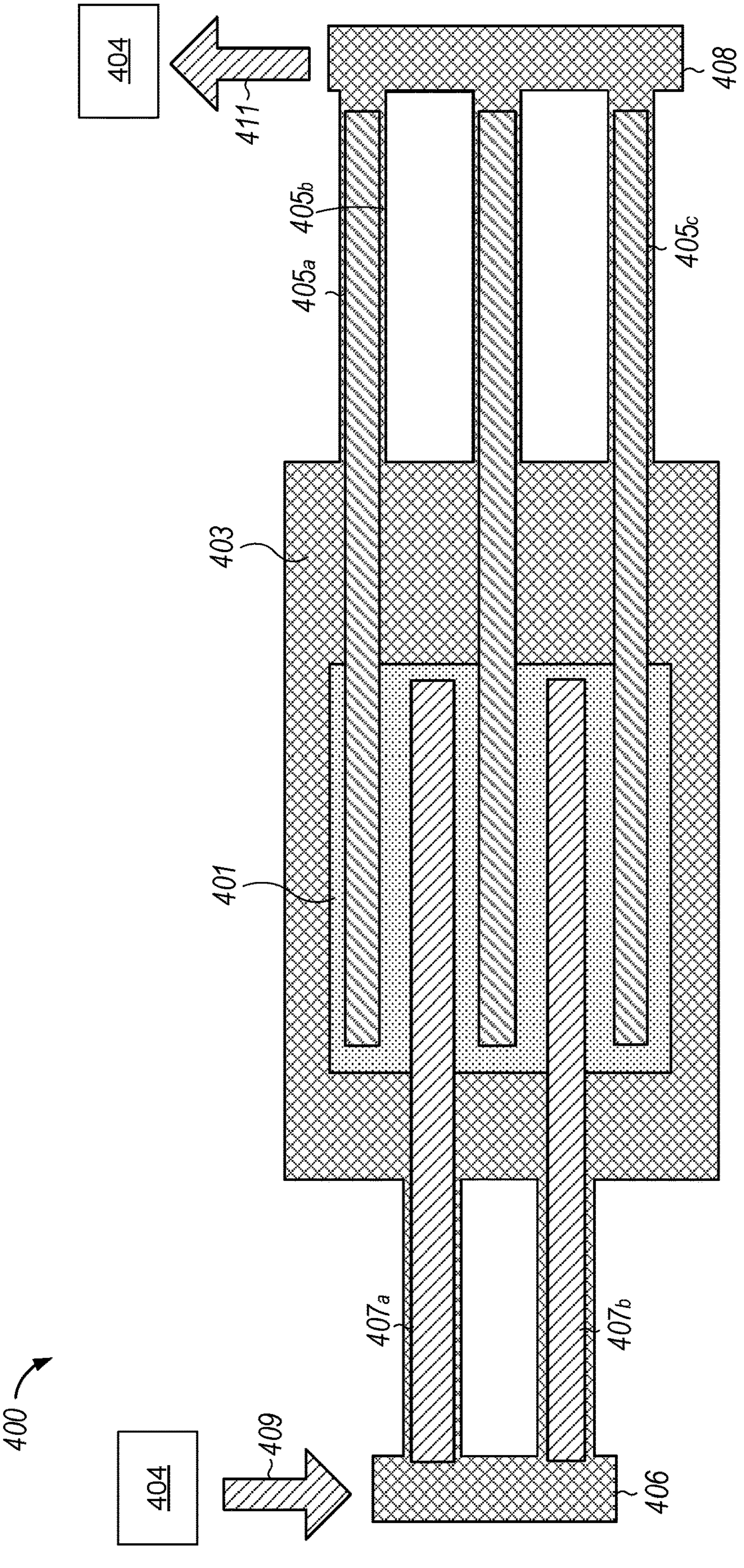
FIG. 4 illustrates another cross-sectioned view of an improved system for cooling a nuclear reactor with hydride moderators, in accordance with at least one other non-limiting aspect of the present disclosure.

Referring now to FIG. 4, another improved system 400 for cooling a nuclear reactor with hydride moderators is depicted in accordance with at least one other non-limiting aspect of the present disclosure. Similar to the system 200 of FIG. 2, the system 400 of FIG. 4 can include a nuclear reactor core 401 portion that is integral to and/or positioned within an enclosure of a heat exchanger 403 portion of the system 400. However, similar to the system 300 of FIG. 3, the system 400 of FIG. 4 can further include moderator heat pipes 407$_{a}$, 407$_{b}$ (collectively, "407") and power heat pipes 405$_{a-c}$ (collectively, "405") that enter a nuclear reactor core 401 portion of the system 400 from opposite sides. As such, the system 400 of FIG. 4 can include an input 409 of a first plenum 406 that is disposed on an opposite side of the nuclear reactor core 401 portion relative to an output 411 of a second plenum 408 of the heat exchanger 403 portion.

For example, according to the non-limiting aspect of FIG. 4, an external working fluid (e.g., air, helium, etc.) can be introduced into the system 400 of FIG. 4 via the input 409 of the first plenum 406 where, during a first stage, it traverses over and transfers thermal energy away from the one or more moderator heat pipes 407 prior to traversing around the nuclear reactor core 401 portion to the second stage, where it traverses the one or more power heat pipes 407, and transfers thermal energy away from the one or more power heat pipes 407. The external fluid can then exit the system 400 to a power conversion sub-system 404 the via an output 411 of a second plenum 408. The power conversion sub-system 404 can be configured similar to the power conversion sub-systems 104, 204, 304 of FIGS. 1-3 and can turn thermal energy removed from the heat pipes 405, 407 into usable energy (e.g., electricity, etc.). As such, via the two-stage heat exchanger 403 portion, the system 400 of FIG. 4 can also generate optimal levels of energy while preventing hydrogen dissociation within moderator cells. However, similar to the system 200 of FIG. 2, the system 400 of FIG. 4 can eliminate the need to seal the heat exchanger 403 portion to the heat pipes 405 and 407.

Figure 5:
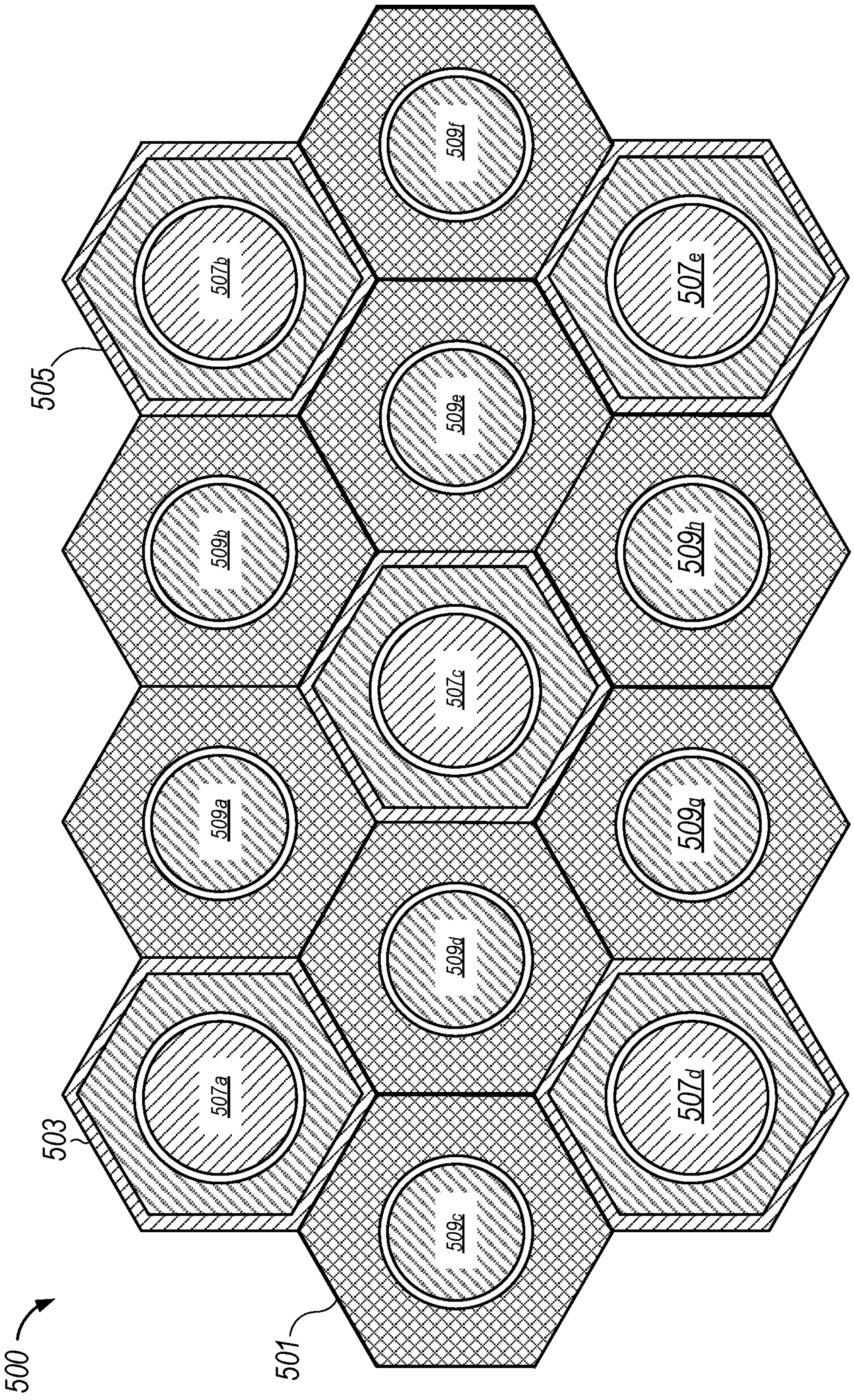
FIG. 5 illustrates a cross-sectioned view of a scalable core of a nuclear reactor configured to be cooled via any of the systems of FIGS. 1-4, in accordance with at least one non-limiting aspect of the present disclosure.

Referring now to FIG. 5, a cross-sectioned view of a scalable core of a nuclear reactor 500 configured to be cooled via any of the systems of FIGS. 1-4 is depicted in accordance with at least one non-limiting aspect of the present disclosure. According to the non-limiting aspect of FIG. 5, the nuclear reactor 500 can include a plurality of fuel cells 501, wherein a plurality of moderator cells 505 are interspersed throughout the plurality of fuel cells 501. As depicted in FIG. 5, the moderator cells 505 can be separated from adjacent fuel cells 501 via a layer of insulation 503, which enables the fuel cells 501 to operate at a desirable, high temperature reactor while the moderator cells 505 operate at a lower temperature, which can prevent disassociation of hydrogen from the hydride moderator material. Although the cells 501, 505 of the core 500 of FIG. 5 include a hexagonal configuration, it shall be appreciated that, according to other non-limiting aspects, the cells 501, 505 can include an alternate geometry (e.g., rectangular, triangular, octagonal, etc.) such that the core 500 can establish any other form. According to some non-limiting aspects, the cells 501, 505 can be geometrically configured such that the core 500 can be scaled in terms of power output, while remaining suitable for use with a two-stage heat exchanger, as will be discussed in further detail below.

In further reference to FIG. 5, the core can include a plurality of moderator heat pipes 507$_{a-e}$ (collectively, "507") that traverse through the moderator cells 505 and a plurality of power heat pipes 509$_{a-h}$ (collectively, "509") that traverse through the fuel cells 501. The heat pipes 507, 509 can extend out of the core 500 and into a two-stage heat exchanger, configured similar to any of the heat exchanger 103, 203, 303, 403 portions of FIGS. 1-4, such that thermal energy is transferred off of the moderator heat pipes 507 in a first stage and thermal energy is transferred off of the power heat pipes 509 in a second stage. As such, via the two-stage heat exchanger, the core 500 of FIG. 5 can also generate optimal levels of energy while preventing hydrogen dissociation within moderator cells 505. Notably, the cells 501, 505 of the core 500 of FIG. 5 are configured such that two dedicated sets of heat pipes 507, 509 can be used to transfer energy, thereby rendering the core 500 suitable for use with a two-stage heat exchanger.

Figure 6:
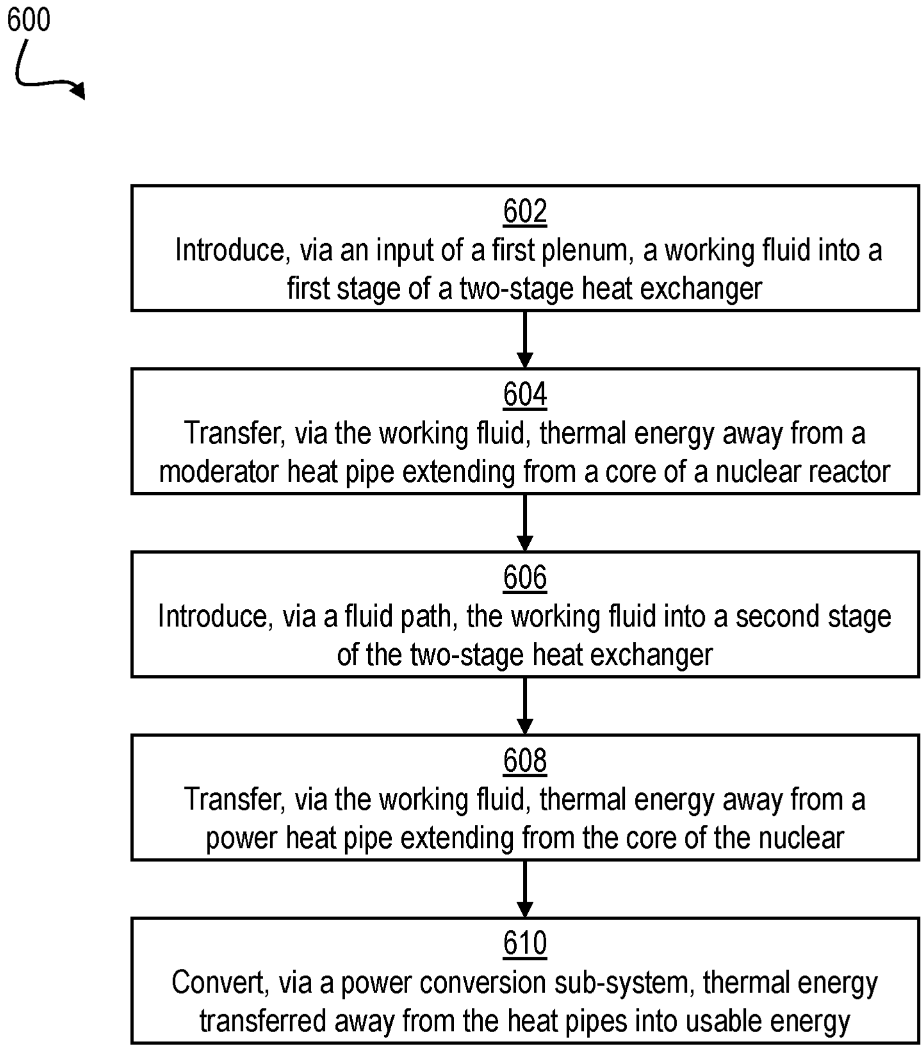
FIG. 6 illustrates a flow diagram of an improved method of cooling a nuclear reactor with hydride moderators, in accordance with at least one non-limiting aspect of the present disclosure.

Referring now to FIG. 6, a flow diagram of an improved method 600 of cooling a nuclear reactor with hydride moderators is depicted in accordance with at least one non-limiting aspect of the present disclosure. For example, the method 600 of FIG. 6 can be performed via any of the aforementioned systems 100, 200, 300, 400 described in reference to FIGS. 1-4. According to the non-limiting aspect of FIG. 6, the method 600 can include introducing 602, via an input of a first plenum, an external working fluid into a first stage of a two-stage heat exchanger. Once the working fluid has been introduced into the first stage of the heat exchanger, the method 600 can further include transferring 604, via the working fluid, thermal energy away from a moderator heat pipe extending from a core of a nuclear reactor. After thermal energy has been transferred away from the moderator heat pipe, the method 600 can include introducing 606, via a fluid path, the working fluid into a second stage of the two-stage heat exchanger. Once the working fluid has been introduced into the second stage of the heat exchanger, the method 600 can further include transferring 608, via the working fluid, thermal energy away from a power heat pipe extending from the core of the nuclear reactor. According to some non-limiting aspects, the method 600 can further include converting, via a power conversion sub-system, thermal energy transferred away from the moderator heat pipe and thermal energy transferred away from the power heat pipe into usable energy, such as electricity, for example.

Various aspects of the subject matter described herein are set out in the following numbered clauses:

Clause 1: A heat exchanger for cooling a nuclear reactor core, the heat exchanger including: a first stage including: an input configured to receive a working fluid from an external source into the heat exchanger; and a first plenum configured to envelope a moderator heat pipe extending from the core of the nuclear reactor; and a second stage including: an output configured to remove a working fluid from the heat exchanger to the external source; and a second plenum configured to envelope a power heat pipe extending from the nuclear reactor core, wherein the first plenum and the second plenum are in fluid communication and configured such that the external fluid must traverse the first plenum and over the moderator heat pipe before entering the second plenum and traversing over the power heat pipe.

Clause 2. The heat exchanger according to clause 1, wherein the external source includes a power conversion sub-system configured to convert thermal energy from the working fluid received from the output into usable energy.

Clause 3. The heat exchanger according to either of clauses 1 or 2, wherein the usable energy is electricity.

Clause 4. The heat exchanger according to any of clauses 1-3, wherein the first stage is dispositioned on an opposite side of the core of the nuclear reactor relative to the second stage.

Clause 5. The heat exchanger according to any of clauses 1-4, further including a duct configured to form a fluid path between the first plenum to the second plenum, wherein the duct traverses external to the nuclear reactor core.

Clause 6. The heat exchanger according to any of clauses 1-5, further including a seal configured to connect the heat exchanger to the power heat pipe and the moderator heat pipe.

Clause 7. The heat exchanger according to any of clauses 1-6, further including an enclosure configured to envelope the first stage of the heat exchanger, the second stage of the heat exchanger, and the nuclear reactor core, wherein the first stage of the heat exchanger, the second stage of the heat exchanger, and the nuclear reactor core are positioned within the enclosure.

Clause 8. The heat exchanger according to any of clauses 1-7, wherein the moderator heat pipe is coupled to a moderator cell of the nuclear reactor core.

Clause 9. The heat exchanger according to any of clauses 1-8, wherein the moderator cell of the nuclear reactor core includes a hydride, and wherein the first stage of the heat exchanger is configured to.

Clause 10. A system, including: a nuclear reactor core, including: a moderator heat pipe coupled to a moderator cell positioned within the nuclear reactor core; and a power heat pipe coupled to a fuel cell positioned within the nuclear reactor core; and a heat exchanger including: a first plenum configured to envelope the moderator heat pipe; and a second plenum configured to envelope the power heat pipe, wherein the first plenum and the second plenum are in fluid communication and configured such that an external fluid must traverse the first plenum and about the moderator heat pipe before entering the second plenum and traversing about the power heat pipe.

Clause 11. The system according to clause 10, further including a power conversion sub-system in fluid communication with the second plenum, wherein the power conversion sub-system is configured to receive the working fluid from the second plenum and convert thermal energy from the working fluid into usable energy.

Clause 12. The system according to either of clauses 10 or 11, wherein the usable energy is electricity.

Clause 13. The system according to any of clauses 10-12, wherein the first plenum is dispositioned on an opposite side of the nuclear reactor core relative to the second plenum.

Clause 14. The system according to any of clauses 10-13, further including a duct configured to form a fluid path between the first plenum to the second plenum, wherein the duct traverses external to the nuclear reactor core.

Clause 15. The system according to any of clauses 10-14, further including a seal configured to connect the heat exchanger to the power heat pipe and the moderator heat pipe.

Clause 16. The system according to any of clauses 10-15, wherein the heat exchanger further includes an enclosure configured to envelope the first plenum of the heat exchanger, the second plenum of the heat exchanger, and the nuclear reactor core, and wherein the first plenum, the second plenum, and the nuclear reactor core are positioned within the enclosure.

Clause 17. The system according to any of clauses 10-16, wherein the moderator cell of the nuclear reactor core includes a hydride.

Clause 18. The system according to any of clauses 10-17, wherein the first plenum is configured to reduce an amount of hydrogen that is dissociated from the hydride by transferring thermal energy away from the moderator heat pipe.

Clause 19. A method of cooling a nuclear reactor core, the method including: introducing, via an input of a first plenum, an external working fluid into a first stage of a two-stage heat exchanger; transferring, via the working fluid, thermal energy away from a moderator heat pipe extending from the nuclear reactor core; introducing, via a fluid path, the working fluid into a second stage of the two-stage heat exchanger; transferring, via the working fluid, thermal energy away from a power heat pipe extending from the core of the nuclear reactor; and converting, via a power conversion sub-system, the thermal energy transferred away from the moderator heat pipe and the thermal energy transferred away from the power heat pipe into usable energy.

Clause 20. The method according to clause 19, wherein the nuclear reactor core includes a moderator including a hydride, and wherein the method further includes reducing, via the thermal energy transferred away from the moderator heat pipe, an amount of hydrogen that is dissociated from the hydride of the moderator.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A heat exchanger for cooling a nuclear reactor core, the heat exchanger comprising:
- a first stage comprising:
  - an input configured to receive a working fluid from an external source into the heat exchanger; and
  - a first plenum configured to envelope a moderator heat pipe extending from the core of the nuclear reactor; and
- a second stage comprising:
  - an output configured to remove the working fluid from the heat exchanger to the external source; and
  - a second plenum configured to envelope a power heat pipe extending from the nuclear reactor core,
  - wherein the first plenum and the second plenum are in fluid communication and configured such that the external fluid must traverse the first plenum and over the moderator heat pipe before entering the second plenum and before exposure to the power heat pipe.

2. The heat exchanger of claim 1, wherein the external source comprises a power conversion sub-system configured to convert thermal energy from the working fluid received from the output into usable energy.

3. The heat exchanger of claim 2, wherein the usable energy comprises electricity.

4. The heat exchanger of claim 1, wherein the first stage is dispositioned on an opposite side of the core of the nuclear reactor relative to the second stage.

5. The heat exchanger of claim 4, further comprising a duct configured to form a fluid path between the first plenum to the second plenum, wherein the duct traverses external to the nuclear reactor core.

6. The heat exchanger of claim 1, further comprising a seal configured to connect the heat exchanger to the power heat pipe and the moderator heat pipe.

7. The heat exchanger of claim 1, further comprising an enclosure configured to envelope the first stage of the heat exchanger, the second stage of the heat exchanger, and the nuclear reactor core, wherein the first stage of the heat exchanger, the second stage of the heat exchanger, and the nuclear reactor core are positioned within the enclosure.

8. The heat exchanger of claim 1, wherein the moderator heat pipe is coupled to a moderator cell of the nuclear reactor core.

9. The heat exchanger of claim 1, wherein the moderator cell of the nuclear reactor core comprises a hydride, and wherein the first stage of the heat exchanger is configured to reduce an amount of hydrogen that is dissociated from the hydride by transferring thermal energy away from the moderator heat pipe.

10. The heat exchanger of claim 1, wherein the first plenum and the second plenum are configured such that the external fluid must traverse the first plenum and over only the moderator heat pipe before entering the second plenum and traversing over only the power heat pipe.

11. A system, comprising:
- a nuclear reactor core, comprising:
  - a moderator heat pipe coupled to a moderator cell positioned within the nuclear reactor core; and
  - a power heat pipe coupled to a fuel cell positioned within the nuclear reactor core;

and
- a heat exchanger comprising:
  - a first plenum configured to envelope the moderator heat pipe; and
  - a second plenum configured to envelope the power heat pipe, wherein the first plenum and the second plenum are in fluid communication and configured such that an external fluid must traverse the first plenum and about the moderator heat pipe before entering the second plenum and before exposure to the power heat pipe.

12. The system of claim 11, further comprising a power conversion sub-system in fluid communication with the second plenum, wherein the power conversion sub-system is configured to receive the working fluid from the second plenum and convert thermal energy from the working fluid into usable energy.

13. The system of claim 12, wherein the usable energy is electricity.

14. The system of claim 11, wherein the first plenum is dispositioned on an opposite side of the nuclear reactor core relative to the second plenum.

15. The system of claim 14, further comprising a duct configured to form a fluid path between the first plenum to the second plenum, wherein the duct traverses external to the nuclear reactor core.

16. The system of claim 11, further comprising a seal configured to connect the heat exchanger to the power heat pipe and the moderator heat pipe.

17. The system of claim 11, wherein the heat exchanger further comprises an enclosure configured to envelope the first plenum of the heat exchanger, the second plenum of the heat exchanger, and the nuclear reactor core, and wherein the first plenum, the second plenum, and the nuclear reactor core are positioned within the enclosure.

18. The system of claim 11, wherein the moderator cell of the nuclear reactor core comprises a hydride.

19. The system of claim 18, wherein the first plenum is configured to reduce an amount of hydrogen that is dissociated from the hydride by transferring thermal energy away from the moderator heat pipe.

20. The system of claim 11, wherein the first plenum and the second plenum are in fluid communication and configured such that an external fluid must traverse the first plenum and about only the moderator heat pipe before entering the second plenum and traversing about only the power heat pipe.

* * * * *